Dec. 6, 1927. Re. 16,810

E. B. THURSTON

SWITCH MECHANISM

Original Filed July 13, 1921 3 Sheets-Sheet 1

Ernest B. Thurston Inventor

By Owen & Owen

Attorneys

Dec. 6, 1927. Re. 16,810

E. B. THURSTON

SWITCH MECHANISM

Original Filed July 13, 1921 3 Sheets-Sheet 2

Ernest B. Thurston Inventor

By Owen J. Owen

Attorneys

Dec. 6, 1927. Re. 16,810

E. B. THURSTON

SWITCH MECHANISM

Original Filed July 13, 1921 3 Sheets-Sheet 3

Ernest B. Thurston Inventor

By Owen & Owen

Attorneys

Reissued Dec. 6, 1927. Re. 16,810

UNITED STATES PATENT OFFICE.

ERNEST B. THURSTON, OF TOLEDO, OHIO, ASSIGNOR TO THE HAUGHTON ELEVATOR & MACHINE CO., OF TOLEDO, OHIO, A CORPORATION OF OHIO.

SWITCH MECHANISM.

Original No. 1,585,517, dated May 18, 1926, Serial No. 484,429, filed July 13, 1921. Application for reissue filed April 11, 1927. Serial No. 182,941.

This invention relates to electromagnetic motor operated switches.

The invention has especial utility when incorporated in connection with polyphase electric current torque or high internal resistance switch-operating motors for elevator service; but is also useful in connection with any electrical power apparatus which is subjected to frequent starting and stopping.

Referring to the drawings.

Figure 1:
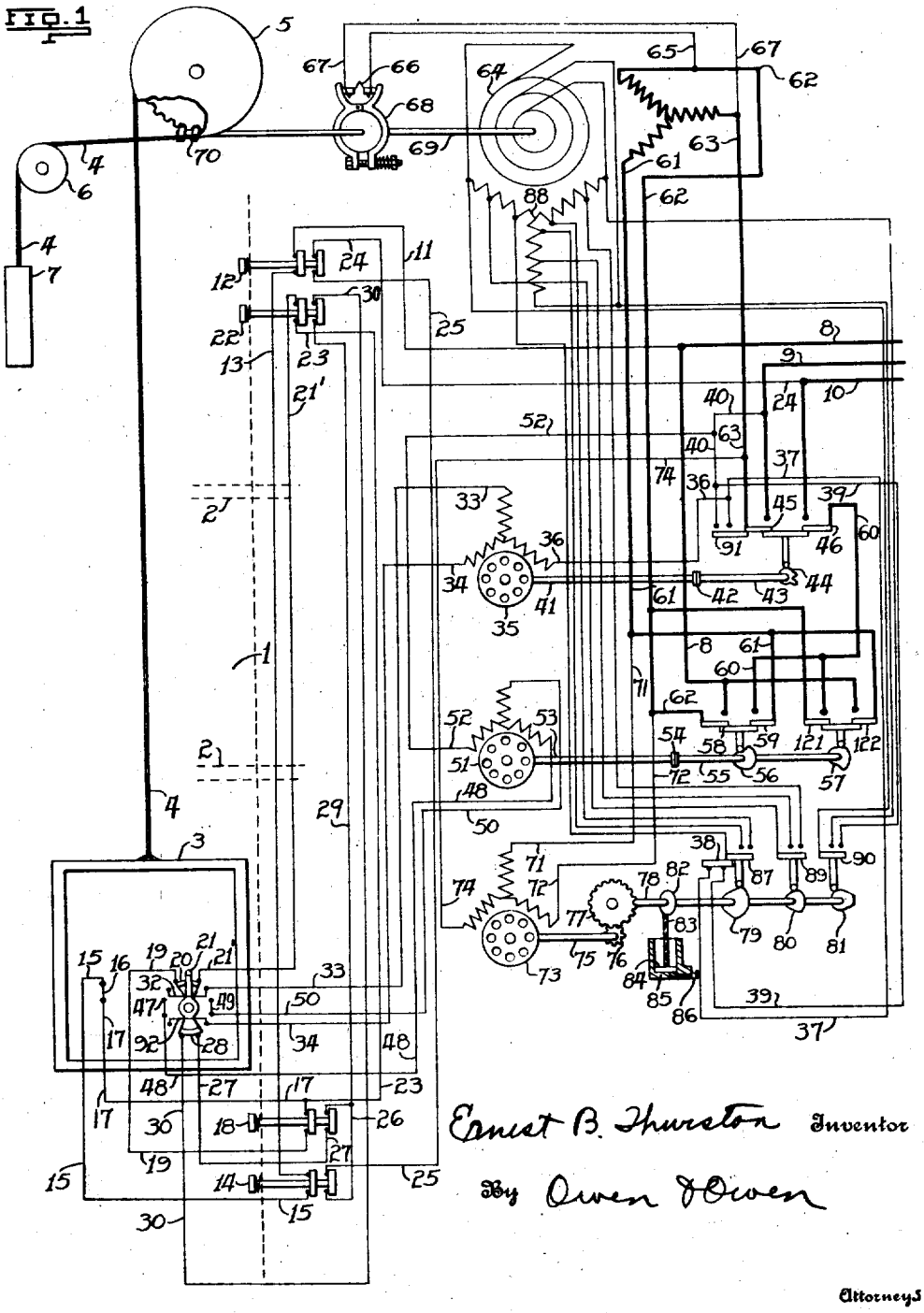
Figure 1 is a wiring diagram wherein the alternating current is three-phase three-wire, incorporated for elevator service, with the controller on the elevator car, disclosing an embodiment of the invention.
Figure 3:
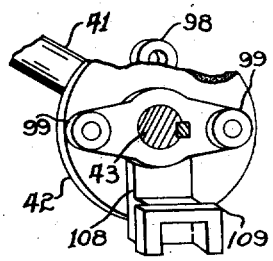
Fig. 3 is a detail view of a flexible coupling for the motor shaft.

In the elevator shaft 1 having landings 2 is operable elevator car 3 carried by hoist line 4 passing about drum 5 over idler 6 to counterweight 7. Alternating electric current supply is shown which may be sixty cycle, three phase, by way of supply lines 8, 9, 10. From the line 8 branch line 11 extends through upper overtravel switch 12, thence by line 13 through lower overtravel switch 14, thence by line 15 through emergency switch 16 in the car 3, thence by line 17 through lower final or stopping switch 18 by way of line 19 to contact 20 on arm of controller 21 in the car 3. This contact 20 on the controller 21 when in off position connects across to line 21′ through upper final or stopping switch 22, thence by line 23 to connect with the line 17. The emergency switch 16 is accordingly in the lines for both overtravel limit switches as to the supply from the line 8. From the supply line 10 is branch line 24 through upper overtravel switch 12, thence by way of line 25 through the lower overtravel switch 14, thence by line 26 through the lower or final or stopping switch 18, and thence by way of line 27 to controller-carried bottom contact 28 on the controller 21. Should this lower final or stopping switch 18 be open, there is branch line 29 from the line 26 by way of the upper stopping switch 22, extending from thence by line 30 to the lower contact 28 of the controller 21. Accordingly, in shifting the controller 21 to the left, the contact 20 is moved away from the line 21′ and the contact 28 is moved away from the line 30. This automatically cuts out the upper final switch 22 as to the controller 21, for this shifting of the controller to the left is effective for operating the car 3 for downward travel. Reverse shifting for car travel upward cuts out the switch 18.

Figure 2:
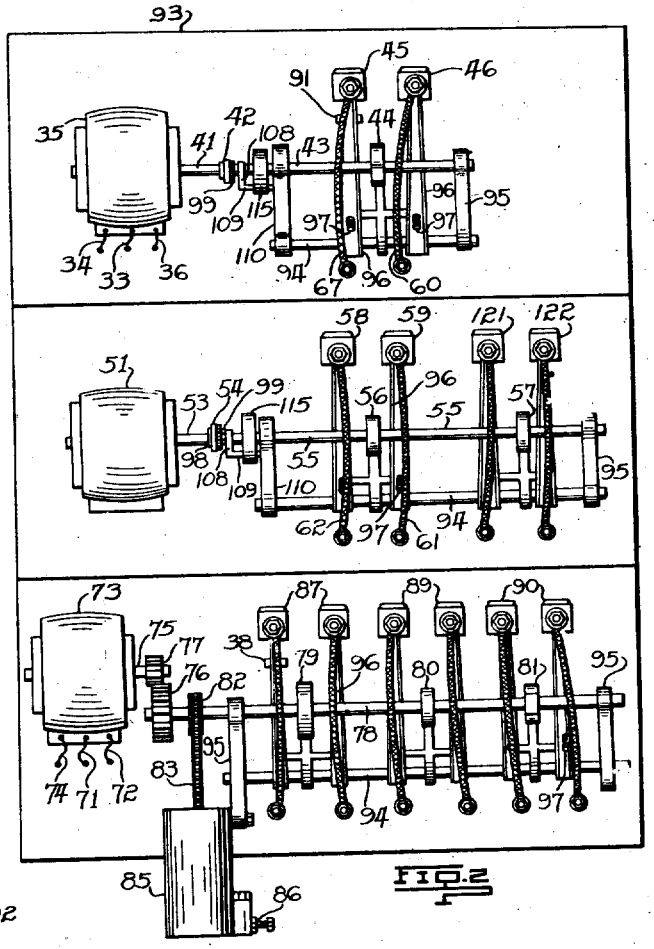
Fig. 2 is a front elevation of the switch board for the wiring installation of Fig. 1.

The contact 20 is in this movement brought to connect the line 19 with line 32 extending to line 33. Simultaneously with this shifting of the contact 20 of the controller 21, the contact 28 of the controller 21 connects the line 27 with line 34. These lines 33, 34 extend to main switch operating motor 35, the third line to this motor being connected by way of line 36 to line 37, contact 38 on the accelerating switch, and thence by line 39 to line 40, connecting with the supply line 9. This main switch motor 35 has shaft 41, provided with flexible connection 42 to rock-shaft 43 carrying cam 44 effective for throwing switch contacts 45, 46 of the main switch. It will be understood that the motor 35, as well as the other switch operating motors 51 and 73, shown in Figure 2, are of the type comprising a rotary magnet having a constant torque throughout its operating range, with a shaft having a limited rocking movement, and windings that permit the motor to stand still with the current on, for a considerable length of time, without becoming overheated.

Further shifting of this controller 21 in the car 3 to the left brings the contact 20 to line 47 extending to line 48, while simultaneously the contact 28 is swung to line 50. These lines 48, 50 extend to direction-switch-operating motor 51, having a third line 52 therefrom connected with the line 40 from the supply line 9.

This energizing of direction switch torque motor 51 operates its motor shaft 53, having flexible coupling 54 with rock-shaft 55 carrying direction-switch-operating cams 56, 57. The cam 56 for down direction travel of the car 3 throws contacts 58, 59. The contact 59 is effective by way of line 60 from the supply line 10 by the main motor-switch contact 46 to line 61. Simultaneously the supply line 8 is connected by contact 58 with line 62. The throw of the main switch contact 45 connects supply line 9 with line 63. These lines 61, 62, 63 extend to three-phase slip-ring main elevator motor 64. From the line 62 extends the line 65 to coil 66, thence by line 67 to line 63. Accordingly, simultaneously with the energizing of the field coil from the lines 61, 62, 63 of this motor 64, coil 66 releases brake 68 so that this motor 64 may operate shaft 69, and through worm speed reduction gearing 70 rotate the drum 5 in a direction to lower the car 3 in the shaft 1.

The line 61 has branch 71 and the line 62, branch 72, both extending to accelerator-switch motor 73, having a third line 74 therefrom connected to line 63. The accelerator-switch torque motor 73 is on shaft 75, having pinion 76 in mesh with gear 77 for two-to-one speed reduction driving of cam shaft 78, carrying cams 79, 80, 81. The travel of this cam shaft 78 is resisted. This resistance is herein shown to embody a disk 82, having flexible connection 83 with piston 84 in cylinder 85 of a dash pot device, the leakage of which may be adjusted by valve 86.

Accordingly, the main-switch-operating torque motor 35 is first effective, and as the controller 21 is shifted to the second position, the direction-switch torque motor 51 becomes effective. Immediately following the operation of this direction-switch motor 51, accelerating-switch motor 73 is actuated. As the shaft 78, retarded by the dash-pot device 82, 83, 84, 85, 86, starts operation there is a throwing of contact 87 for cutting out the first portion of starting resistance 88 in the main motor 64. At the determined period of time thereafter in the operation of the shaft 78, contact 89 cuts out an additional portion of the resistance 88, and this is followed by contact 90 cutting out the balance of the resistance 88 as the motor 64 comes up to speed.

The movement of the contact 87 carries with it the contact 38, thereby opening the line initially effective for completing the plurality of phases for operating the main-switch motor 35. However, inasmuch as the main switch is thrown, the contact 45 carries with it contact 91, thus maintaining closed the circuit between lines 37 and 40, so that the action of the accelerating switch does not effect an opening of the main switch. The main motor 64 may accordingly be stopped by cutting out the direction switch short of moving controller 21 to neutral position to cut out the direction motor 51, and the main switch will still be held in. However, any other action of the controller, or action as to the lines which cuts out the main switch, at once brings about a full stopping of the main motor 64, and there may not be a restarting of this main motor 64 until after the accelerating switch has come to starting position. For upward direction of travel, the controller 21 is shifted to the right for engaging contact 20 with line 33, and contact 28 with line 92, the latter extending to line 34. Further shifting of controller 21 for effecting upward direction travel brings the contact 20 to line 49, connected to line 50, and the contact 28 to line 47, connected to line 48, reversing the throw operation of the motor 51.

The embodiment of the devices of this disclosure for electromagnetic or torque motor control for all of the switches is herein developed for a main assembly control board embodiment in the remote control of the switches from the elevator car. Control board 93, Fig. 2, carries the usual board contacts rigidly mounted thereon and supports brackets 95, 110, in which are rotatably mounted the cam shafts 43, 55, 78 and the movable-contact-carrying shafts 94. Mounted on the shafts 94 are arms 96, carrying movable contacts 45, 46, 58, 59, 121, 122, 87, 89 and 90. These movable contacts are normally yieldably directed towards their respective board contacts by coiled springs 97, which are carried on bolts 97[a] and normally compressed between the arms 96 and nuts on the ends of the bolts. The other ends of these bolts are anchored in switch-closing arms 103, and the arms 96 are apertured to permit of the passage of the bolts therethrough.

Motor shaft 41 has arms 98 staggered with arms 99 on shaft 43 to carry therebetween the flexible disk coupling 42. Switch actuating cam 44, mounted on shaft 43, has similar actuating regions for each direction of oscillation, consisting of uniform accelerating portions 100 and slow down portions 101. The portions 100 of the cam 44 approximate about 5° inward direction from the tangent of contact of the roller 102 to be actuated by the cam, thus permitting about a 10° rock of the cam without moving the switch-closing arm 103. Roller 102 is carried by switch-closing arm 103 fast with the shaft 94 effective for simultaneous throwing of contact-arms 96, also fast on shaft 94. Arm 103 has extension 104 (Fig. 6), which in position of rest of the cam 44 has its end 104ᵃ registering with and adjacent to projection 105 of the cam. Cam 44 is accordingly effective for holding the contact arms 96 outward, so that contacts 45, 46 are maintained open until cam 44 is rocked.

Figure 6:
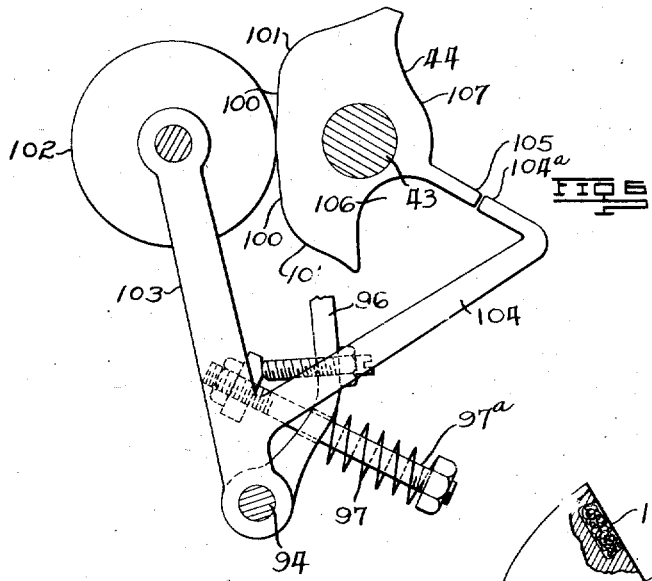
Fig. 6 is a side elevation of the main motor switch cam, the cam-engaging means, and the contact-carrying arm, the latter being partly broken away.
Figure 7:
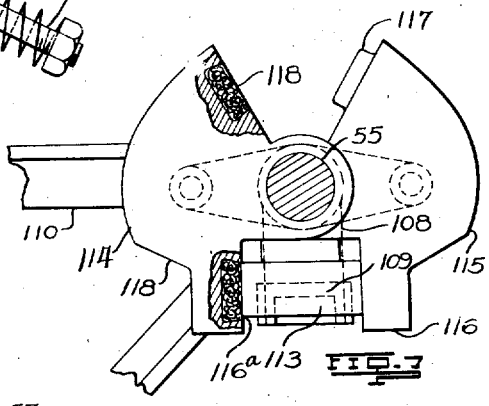
Fig. 7 is a section of the rock shaft for the main or direction switch, showing the weights and the arm for lifting the weights mounted thereon.

In rocking shaft 43 in either direction from the position of rest shown in Fig. 6, roller 102 rides outward approximately 55° over an accelerating portion 100 and onto one of the slow down portions 101, effecting a throwing in of the contact arms 96 rapidly at first and then more slowly as they near contact-closing position. As this throw is being effected by the travel of the switch-throwing arm 103, the projection 104 moves into one of the recesses 106, 107 of the cam 44.

Figure 5:
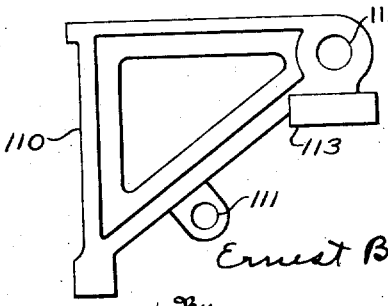
Fig. 5 is a detail view of the stop-carrying bracket for the weights.

Integral with shaft-coupling arm 99 is a depending arm 108, having enlarged offset portion 109. The driven shaft section 43, adjacent the coupling 42, is mounted in bracket 110, which has bearing 111 (Fig. 5) for the shaft 94 and bearing 112 for the shaft 43. Bracket 110 also carries below the bearing 112 an abutment or stop 113, wider than enlarged portion 109 of the arm 108. Loosely mounted upon the projecting portion of shaft 43 towards coupling 42 are weights 114, 115, designed as rights and lefts. Each weight has a sound deadening felt pad 116ᵃ in a depending ear 116 thereof for impacting with stop 113, and weight 114 has a similar pad 118 in its upper portion for impacting with projection 117 on weight 115.

As the torque motor 35 is energized to move in clockwise rotation, enlargement 109 on arm 108 moves into engagement with pad 116ᵃ of weight 114 and lifts weight 114 until the felt pad 118 seats against the projection 117. The extent of rocking of shaft 43 is limited by weight 115 being held by the stop 113 before it reaches dead center position. This throw is adjusted to approximate 55° in either direction. When the movement of the shaft 43 is stopped by the stop 113, the torque motor 35 will, of course, become stalled. The load of the weight upon the shaft 43 is greater at starting and diminishes as the center of gravity is brought more nearly over the shaft 43. Accordingly, this resisting means of the weight 114 or 115 grows less, while the resistance of the springs 97 at the arms 96 may remain approximately constant, but is not effective until there is contact and movement thereafter.

As soon as the motor 35 is deenergized the springs 97 tend to return the switch-operating motor and the arms 103 to open-switch position, thus opening contacts 45, 46. This return to open-switch position is assisted by one of the weights 114, 115 rocking the shaft section 41, now not influenced by electromagnetic energy, back to its starting position as determined by the weights bringing the arm 108, 109 into registry with and clear of the stop 113, which stop receives the concussion impact of the weights.

Figure 8:
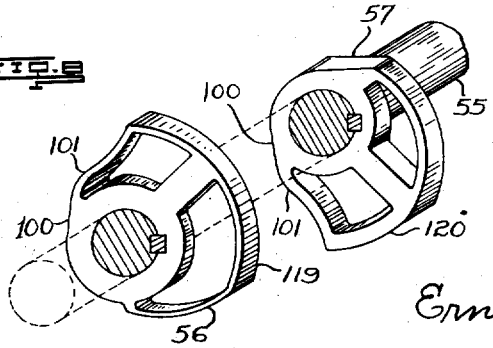
Fig. 8 is a perspective view of the direction-switch actuating cams.
Figure 9:
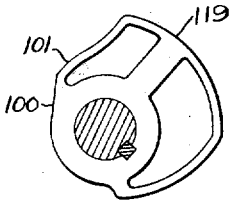
Fig. 9 is a side elevation of one of said cams.

The direction-switch motor-shaft section 53 is connected to cam shaft section 55 in a similar way as to coupling and weights, with arm, as the shaft section 41 is connected to the cam-shaft section 43 at the main switch motor 35. Each of cams 56, 57 has the uniform accelerating region 100 (Figs. 8 and 9), approximating about 5° away from the tangent for the roller 102, which terminates in less active or slow-down portion 101. As to these portions for action the cams 56, 57, are rights and lefts. However, the lock-out portions to be engaged by the arms 104 are somewhat differently disposed. The cam 56 has stop portion 119 extending in the same semi-circular region as its active cam portion, while the cam 57 has its stop engaging portion 120 extending in the same semi-circular region as the active portion of this cam 57.

While in the operation of this device a one-direction-throw cam similar to 56 or 57 might be used in connection with the main-switch motor 35, such would thereby prove a phase reversal stop device for the apparatus, precluding any throwing in of the switch motor 35 upon the reversal of phases. However, with the two-direction-throw cam 44 adapted to this main motor 35, there is an automatic provision caring for phase reversal in that should supply lines 8, 9, 10, as installed, have the phases for operating the main switch 45 clockwise for up-direction travel of the elevator car 3, the rotation of the direction-switch motor 51 also clockwise would result in throwing of the cam 57 for actuating the contacts 121, 122. On phase reversal and throwing of the controller 21 in the same direction, motor 35 would operate counterclockwise and would also operate the direction-switch motor 51 counterclockwise, thereby throwing contacts 58, 59. This means that the direction indication at the controller 21 in the car is correct even with phase reversal, because the reversal in the lines and one motor means a double reversal, thereby neutralizing the effect for car-travel-direction indication of the controller 21. It is true that with this reversal contacts 58, 59 now mean upward travel as against former meaning of downward travel. This is a feature of automatic safety incorporated in this apparatus due to the motor operation of the switches, the motors 45, 51 being polyphase and of the torque type. Furthermore, these motors 35, 51, at once there is a failure on any phase, lose their torque and the springs 97 at once effective in conjunction with the weights 114, 115 in bringing the motors and likewise the switch contacts into open or initial positions. Accordingly, these motors 35, 51, 73, because carrying energizing current when in thrown position, have this safety feature when but one phase is disturbed and notwithstanding there is still a single phase line through each of the motors. In rendering possible this control of polyphase switch-control devices remotely from the controller 21 in the car, the controller 21 is connected to more than one phase of the supply lines.

The automatic operation for self centering in off-position is also true as to the accelerating motor 73, so pulled by the weight of dash-pot piston 84. The three switch-controlling polyphase motors 35, 51, 73 may automatically return to off position. This return by these motors to off position may be on failure of one of the phases of the supply. Such return occurs from a non-sealing position. As the accelerator motor cams 79, 80, 81 are bilateral, phase reversing motor 73 does not disturb the net result of the accelerating-switch control. Each of these switch-operating motors is dissociated from the power motor line as controlled by its switches. These motors are in addition to the power motor of the translation circuit. Furthermore, there is, due to this energizing action of the rotating field in the torque motor, constant pull action by the motor itself so long as the energizing current is therein.

There is symmetry as to the actuators 35, 51, 73. There is symmetry as to the arms 96. Accordingly there is possible interchange of arms and auxiliary motors, one of each capable for replacement anywhere on the board.

The design of the cams has developed a proper timing for quiet and quick control operation by the remote control herein disclosed.

The extensions 104 of the switch-closing arms 103 not only coact with stop-engaging portions 119, 129 of cams 56, 57 to prevent throwing in of the contact-carrying arms 96 before their respective cams are in position to hold them out, but such extensions 104 are effective on rotation of the cams back to off position to positively withdraw the arms 96 from contact or thrown-in position without chattering or bouncing. Accordingly, in any quick reversal of the switch-operating motor, there is an insured positive pulling out of the contact-carrying arms. The throw of the arms 96 largely occurs as the rollers 102 ride along the cam regions 100. The slowing up of the travel of the roller 102 by riding upon a cam portion 101 not only quiets the final closing-in action of the arms 96 at the engaging position of the contacts in the quick throwing-in of the switch, but this slowing up of the travel of the arms allows the motor to more easily compress the springs 97 as the period of motor driving approaches and extends beyond the contact-closing position of the arms 96. There is accordingly a further compression of the springs after contact closing for holding the contacts against vibration and for finally stalling the motor. This compression of the springs also operates as a safety device, as the springs 97 tend to return the arms 103 away from switch-closing position, and is of such effectiveness that even without the weights 114, 115 the arms may be quickly released and contact broken without detrimental arcing.

While the wiring diagram, Fig. 1, indicates the use of reversible cam 44 for operating the main switch, one of the non-reversible cams 56 or 57 could be used with equal advantage in connection with this method of wiring, inasmuch as the connections for the motor 35 are shown as non-reversible. If the reversible feature of cam 44 is to be utilized, the motors 35 and 51 may be connected in parallel and both controlled through the wires 48 and 50. Wires 33 and 34 and the corresponding contacts in the car switch could then be eliminated. The motor 73 is normally connected in parallel with the primary of the power motor, so that it automatically cuts out the accelerating resistance 88.

Figure 4:
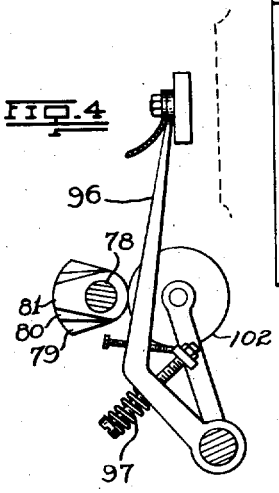
Fig. 4 is a side elevation of one of the accelerator switches, showing the cam-shaft in cross-section and the general relation of the three cams thereon.

The cams 79, 80, 81 for operating the accelerating switches are shown as having concentric portions on which the rollers 102 roll after closing their respective switches, and there is therefore little or no tendency for the contact springs 97 to kick back or return the cam shaft to the neutral position shown in Fig. 4. When operating a power-breaking switch it is desirable, for safety reasons, that the springs 97 have an appreciable kick back action, to overcome any tendency of the switch to hold or stick in closed position. It is therefore desirable to give the slow-down portions 101 of the cams sufficient radius increase to at all times tend, through rollers 102, to return shafts 43 and 55 to their neutral positions.

The cams 44, 56 and 57 are so shaped that the initial and final movements of the contact-carrying arms 96 are gradual and the intermediate movements rapid, both in opening and closing of the switches, thereby rapidly increasing the gap in contact opening and slowing down such movement just before neutral position is reached in opening and just before making contact in closing. Both the accelerating and slowing down movements of the contact-carrying arms are gradual, so that there is no tendency to throw the rollers 102 away from the cams, thereby eliminating noise, hammering of contacts and objectionable vibrations.

When in neutral position, arms 104 come opposite lock-out portions 105, 119 or 120 and act as positive lock-outs for the switches. For example, if shaft 55 were rotated counter-clockwise so that cam 56 would close its cooperating switch, arm 104 of the switch cooperating with cam 57 would remain opposite the concentric lock-out portion 120 on cam 57 and thereby lock its switch out when the other switch is in its closed position.

The terms "closed-switch position", "switch-closing position" and "contact-closing position", as used in some of the claims, are intended to mean the closing of the contacts and do not include the follow up action of arms 103 in further compressing the springs 97 after contact closing.

The term "switch-operating motor" as used in some of the claims is intended to define a rotary magnet having a constant torque, with windings that permit the motor to stand for a substantial period of time with the power applied without injury to the windings.

What I claim is:

1. In a switch for power apparatus, a pair of contacts one carried by a board and the other by a movable arm, a cam for shifting the arm, a switch-operating motor for actuating the cam, the cam being so shaped as to decrease the load on the motor as the cam in its travel brings the arm towards contact-closing position, and a spring so located that it increases the load on the motor after the contact is closed.

2. In a switch for power apparatus, a pair of contacts, an arm for closing the contacts, a cam for shifting the arm, a switch-operating motor for actuating the cam, the cam being so shaped as to cause quick movement of the arm during the main portion of its travel towards contact-closing position and slow movement of the arm immediately previous to contact closing position, and a spring so located as to increase the load on the motor after the contact is closed.

3. In a switch for power apparatus, a pair of contacts, an arm for closing the contacts, a cam for shifting the arm, a switch-operating motor for actuating the cam, the cam being so shaped as to cause quick movement of the arm during the main portion of its travel towards contact-closing position and slow movement of the arm immediately previous to and following contact-closing position, and a spring so located as to increase the load on the motor after the contact is closed.

4. In a switch for power apparatus, a pair of contacts, a switch-closing arm, a switch motor adapted to actuate said arm for a period of travel beyond the closing of the contacts, and intermediate transmission change-speed means between the switch motor and arm for slowing-down action of the arm in the final movement thereof to closed position to quiet switch operation.

5. In a switch for power apparatus, a switch-closing arm, a switch-actuating motor adapted to actuate said arm for a period of travel beyond the closing of the contacts and to a stalled stop position of the motor with current still energizing the motor, and intermediate transmission change-speed means between the switch motor and arm including a slowing-down cam for effecting contact closing to quiet switch operation.

6. A switch for power apparatus, a switch-closing arm, a switch-actuating motor adapted to actuate said arm for a period of travel beyond the closing of the contacts and to a stalled stop position of the motor with current still energizing the motor, intermediate transmission change-speed means between the motor and arm including a cam for slowing down action of the arm in contact closing to quiet switch operation, and a spring opposing motor driving during slowing down action of the cam after the contacts are closed.

7. In combination, an electric switch having one of its contacts movable, a switch-operating motor, connections from the motor for operating the movable contact, yielding means operable after the contacts are closed to press them together and to oppose further rotation of the motor, and means other than said yielding means for stalling the motor when it has rotated a limited distance after closing the contacts and with current still energizing the motor, the said connections adapted to produce slower movement of the contact in proportion to the rotation of the motor as the contacts approach engagement.

8. In combination, an electric switch having a switch-closing arm, a switch-operating motor, connections from the motor for operating said arm, yielding means operable after the contacts are closed to press them together and to oppose further rotation of the motor, and means other than said yielding means for stalling the motor when it has rotated a limited distance after closing the contacts and with current still energizing the motor, the said connections adapted to produce slower movement of the arm in proportion to the rotation of the motor as the contacts approach engagement and thereafter until the motor is stalled.

9. In combination, an electric switch having a movable contact, a switch-operating motor for moving the contact, yielding means pressing the contacts together and opposing further rotation of the motor after the contacts are closed, and means for returning the switch to neutral position, said means opposing the rotation of the motor prior to contact closing and gradually reducing such opposition subsequent to contact closing.

10. In combination, an electric switch comprising a fixed contact, an arm mounted upon a fixed pivot, a contact on the arm in position to properly engage the fixed contact when the arm is rocked to one extreme position, a switch-operating motor comprising windings that enable it to stall and stand without injury with power applied, and connections between the motor and arm for closing the contacts when the motor is actuated, said connections comprising a spring adapted to yield after the contacts are closed and allow limited rotation of the motor without movement of the arm.

11. In combination, an electric switch comprising a pair of contacts one mounted upon a pivoted arm, a switch-operating motor comprising windings that enable it to stall and stand without injury with power applied, connections between said motor and arm comprising a spring adapted to yield after the contacts are closed and allow limited rotation of the motor without movement of the arm, and means other than said yielding means for stalling the motor with the power applied when the switch-closing operation is completed.

12. In combination, an electric switch comprising a pair of contacts one mounted upon a pivoted arm, a switch-operating motor comprising windings that enable it to stall and stand without injury with power applied and adapted to rock the arm to close the contacts, and yielding means so located between said motor and contacts as to permit continued rotation of the motor for a limited distance after the contacts are closed without changing the engagement of the contacts over the same extent of area that is first engaged when the contacts are closed.

13. In a switch for power apparatus, a movable arm having a contact, a second contact to be engaged by the arm-contact, a cam for shifting the arm, a switch-operating motor for actuating the cam independent of the power apparatus, a spring co-acting for follow-up action after said contacts are closed, and means independent of the cam and the spring for opposing the rotation of the motor as the arm approaches contact-closing position and adapted to stall the motor with current still energizing the same after the arm has reached the limit of its contact-closing movement.

14. In combination, an electric switch having one of its contacts movable, a switch-operating motor, connections from the motor for operating the movable contact, a spring operable after the contacts are closed to press them together and to oppose further rotation of the motor, means independent of the spring to stall the motor when it has rotated a limited distance after closing the contacts and with current still energizing the motor, said means tending to offset the resistance of the spring to the rotation of the motor as the motor approaches stalled position.

15. A power-breaking switch provided with a movable contact-carrying arm, a cam for controlling the movements of the arm, and a switch-operating motor for moving said cam, the cam being provided with accelerating and slow-speed portions.

16. A power-breaking switch provided with a movable switch-closing arm, a cam for controlling the movements of the arm, and a switch-operating motor for moving said cam, the cam being provided with accelerating and slow speed portions and the slow-speed portion being effective for limited movement of the arm after contact closing.

17. A switch for power apparatus, a switch-operating motor, a member positively driven by the motor, a two-part arm relatively to which the member is movable, a shaft providing a common axis for the two parts of said arm, an adjustable bolt connecting the two parts of said arm, and a compression spring on said bolt for abutting one part of the arm and through the bolt effective for urging the other part of the arm towards said member, said two-part arm being operable for throwing the switch in response to movements of the member.

18. A power-breaking switch provided with a movable arm and a cam for controlling the movements of the arm, said cam embodying a lock-out portion effective for preventing accidental closing of the switch, and accelerating and slowing-down portions effective in turn to control the movements of the arm as the cam in its travel brings the arm toward fully thrown position.

19. A power-breaking switch provided with a movable arm and a rotary cam for controlling the movements of the arm, said cam embodying a first actuating portion of less than tangent from the starting point, and a second slowing down portion effective in turn as the cam in its travel brings the arm to fully thrown position, and a third lock-out portion for preventing accidental closing of the switch without rotating the cam.

20. A switch having a movable arm, a motor having a shaft for shifting said arm to switch-closing position, and means precluding operating said arm to switch-closing position independently of operating said shaft.

21. A switch having a movable arm, a switch-operating motor having a shaft for shifting said arm to switch-closing position, said motor having windings that permit it to stand with power applied without injury to the motor, and lock-out means precluding operation of said arm to switch-closing position without rotation of said shaft.

22. In combination, an electric switch, a switch-operating shaft, a constant-pull switch-operating motor having a shaft, connections between said shafts for communicating movements from one to the other thereof, and means for positively holding the switch open until the motor shaft is moved in its switch-closing direction.

23. In combination, an electric switch having a movable contact, a constant-pull motor for operating said movable contact and adapted to close the switch when the motor is actuated from open-switch position to closed-switch position, and means positively holding said contact in its open-switch position when the motor is in its open-switch position.

24. A power-breaking switch provided with a movable arm, a cam controlling the movements of said arm, a switch-operating motor for moving said cam, the cam being provided with a portion cooperating with said arm to prevent accidental closing of the switch without rotating the motor, and uniformly accelerating and slow-speed portions successively cooperating with said arm as the cam is moved by the motor for switch closing.

25. In combination, an electric switch having a movable contact, a constant-pull motor for operating said movable contact, and adapted to close the switch when the motor is actuated from open-switch position to closed-switch position and to open the switch when actuated from closed-switch position to open-switch position, a cam controlling the speed of the movable contact from closed-switch to open-switch position to prevent bouncing, and means positively holding said contact in its open-switch position when the motor is in its open-switch position.

26. In a switch for power apparatus, a switch-operating motor independent of said apparatus, a switch-closing arm, the motor being adapted to actuate said arm for a period of travel beyond the closing of the switch and to a stalled position of the motor with current still energizing the same, a member directly connected to and positively driven by the motor, said member being movable relatively to said arm and having means coacting with said arm to move it positively into and out of switch-closing position.

27. A switch having a movable arm, a motor having a shaft for shifting said arm to switch-closing position and capable of movement beyond switch-closing position, said motor comprising windings that enable it to stall and stand without injury with the power applied, lock-out means precluding operation of said arm to switch-closing position without rotation of said shaft, and means for stalling the motor after it has passed switch-closing position.

28. In combination, an electric switch, a switch-operating shaft, a motor for operating said shaft comprising windings that enable it to stall and stand without injury while energized, means for yieldingly closing the switch when the shaft is oscillated in one direction, means for positively opening the switch when the shaft is returned to its initial position, and means for stalling said motor after it has moved a predetermined distance beyond switch-closing position.

29. A switch for power apparatus, a switch-operating motor adapted to actuate a switch-closing arm for a period of travel beyond the closing of the contact, and intermediate transmission change-speed means between the motor and arm for slowing down action in contact closing for quieting switch operation, said transmission means being provided with a movable lock-out for the switch when in opened position.

30. In combination, an electric switch, a switch-operating shaft, a motor for operating said shaft comprising windings that enable it to stall and stand without injury while energized, means for yieldingly closing the switch when the shaft is oscillated in one direction, means for stalling said motor after it has moved a predetermined distance beyond switch-closing position, and means for positively opening the switch when the shaft is returned to its initial position and for controlling the speed of such return so as to avoid bouncing of the switch arm.

31. A pair of switches for the translation circuit of a power motor apparatus, said switches each having a movable arm, an actuating shaft for the switches, a switch-operating motor in a control circuit complete in itself, said switch-operating motor being for actuating said shaft, and a cam for each switch mounted on said shaft, each cam provided with an arm-shifting portion and an arm lock-out portion oppositely disposed, the cams being so arranged on the shaft that rotation thereof in one direction throws one switch in and holds the other out and rotation in the opposite direction holds the one switch out and throws the other in.

32. In combination, an electric switch, a rock shaft, connections whereby rocking the shaft in one direction closes the switch, a stationary abutment beneath the shaft, a weighted arm pivoted adjacent the abutment and normally resting thereagainst, and an actuating arm on the rock shaft, spaced from the weighted arm when the rock shaft is at rest in open-switch position and adapted to move against and then raise the weighted arm when the shaft is rocked to switch-closing position.

33. In combination, an electric switch, a rock shaft having a normal rest position, connections whereby rocking the shaft from said position closes the switch, a weight having a normal rest position, and an arm on the shaft out of engagement with the weight when the parts are in their rest position and adapted to move against and raise the weight when the shaft is rocked to switch-closing position.

34. In combination, an electric switch, a rock shaft having a normal rest position, connections between the shaft and switch whereby the switch is closed by rocking the shaft from its rest position, a weight having a rest position, and lost-motion connections between the weight and shaft whereby the shaft is permitted to move a short distance from its rest position without moving the weight and to then raise the weight upon the movement of the shaft further from its rest position.

35. In combination, two electric switches, a rock shaft having a position of rest, connections between the rock shaft and switches whereby both switches are open when the shaft is in its position of rest and movement of the shaft in one direction closes one switch and movement of the shaft in the other direction closes the other switch, an arm on the shaft, a weight mechanism having a position of rest spaced from the position of rest of the arm, so that after the arm has travelled a limited distance in either direction it engages and raises one of the weights.

36. In combination, two electric switches, a rock shaft, connections between the rock shaft and switches whereby rocking the shaft in one direction closes one switch and rocking the shaft in the opposite direction closes the other switch, a stationary abutment beneath the shaft, two weights loosely pivoted upon the shaft and normally resting against the abutment, and an arm on the shaft projecting downward when both switches are open and being narrower than the abutment and in position to engage a weight upon coming into alignment with either edge of the abutment.

37. A rock shaft having a driving section, a driven section aligned with said driving section, a flexible maintained transmission connection therebetween, a stationary abutment adjacent the shaft, an arm fixed upon the driven section and registering with said abutment, spaced weights loosely mounted on the driven section and normally hanging against said abutment, said arm effective in one direction of shaft rotation to move into contact with and then lift one of said weights until it contacts with the other weight while the latter rests against the abutment and said arm effective in the opposite direction of shaft rotation to move into contact with and then lift the other of said weights to bring it into contact with the first mentioned weight to limit the movement of shaft rotation in such opposite direction.

38. A sectional switch-operating shaft embodying driving and driven sections and having maintained transmission connection between said sections, the driven section having an actuating arm operable in either direction of rotation, a switch operating motor for actuating said driving section, a pair of weighted arms on said driven section, one of said arms adapted to be engaged by said actuating arm and then lifted in one direction of shaft rotation and the other adapted to be engaged by said actuating arm and then lifted in the other direction of shaft rotation, a pair of switches having parallel arms, and means on the shaft for throwing the arms of one switch in one direction of shaft rotation and for throwing the arms of the other switch in the other direction of shaft rotation.

39. In a switch-operating mechanism, driving and driven shaft sections having maintained transmission connection therebetween, a switch-operating motor for actuating the driving shaft section, an actuating arm fixed on one of said shaft sections and a pair of weighted arms loosely mounted on one of said shaft sections, a stationary abutment adjacent the position of rest of said actuating arm, said weighted arms normally resting against said abutment clear of said actuating arm and said actuating arm being adapted to engage and lift one of said weighted arms in one direction of shaft rotation and to engage and lift the other weighted arm in the other direction of shaft rotation.

40. Power actuation means for a switch including a rock-shaft driving section, a driven section with which said driving section has a uniformly maintained driving connection, a momentum-storing weight loosely rockably mounted on the shaft driven section, engaging means for angularly shifting the weight on shaft actuation, and sound deadening stop means for the weight.

41. Power actuation means for a switch including a rock-shaft driving section, a driven section with which said driving section has a uniformly maintained driving connection, a momentum-storing weight loosely rockably mounted on one of said shaft sections, engaging means for angularly shifting the weight on shaft actuation, and sound deadening stop means for the weight.

In testimony whereof, I have hereunto signed my name to this specification.

ERNEST B. THURSTON.